(No Model.)

G. E. BEDELL.
SPRING BED FRAME.

No. 315,998. Patented Apr. 21, 1885.

WITNESSES:
E. C. Metcalf
William P. Dies

INVENTOR.
George E. Bedell
By Edwin H. Risley
his atty.

UNITED STATES PATENT OFFICE.

GEORGE E. BEDELL, OF HERKIMER, NEW YORK.

SPRING BED-FRAME.

SPECIFICATION forming part of Letters Patent No. 315,998, dated April 21, 1885.

Application filed December 13, 1883. (No model.)

*To all whom it may concern:*

Be it known that I, GEORGE E. BEDELL, of the town of Herkimer, in the county of Herkimer and State of New York, and a citizen of the United States, have invented a new and useful Improvement in Spring Bed-Frames; and I do hereby declare the following to be a full, clear, and exact description of the same, reference being had to the accompanying drawings, and to the letters and figures marked thereon.

My invention relates to that class of mechanism consisting of the side bars to a spring bed-bottom; and it consists of a simple, cheap, and efficient device for forming the side bars of an ordinary spring bed bottom or frame covered with coiled wire, and adapted to be tightened from time to time as the bed-bottom expands. Heretofore great trouble and inconvenience in constructing this form of spring-beds have been experienced in consequence of the warping of the side bars, occasioned by the strain on the surface of the bed-bottom. I overcome this tendency in the side bars to warp by a circular side bar. Experience has demonstrated that a side bar to a spring bed-bottom made in one piece will not stand the strain occasioned by tightening the wire forming the surface of the bed, which is adjusted at the top of the frame. The side bar invariably warps downward out of line by the tension produced in tightening the wire. By the use of my invention that tendency is entirely overcome.

Having described the nature and construction of my invention, I will now describe it with reference to accompanying drawings, in which—

Figure 1:
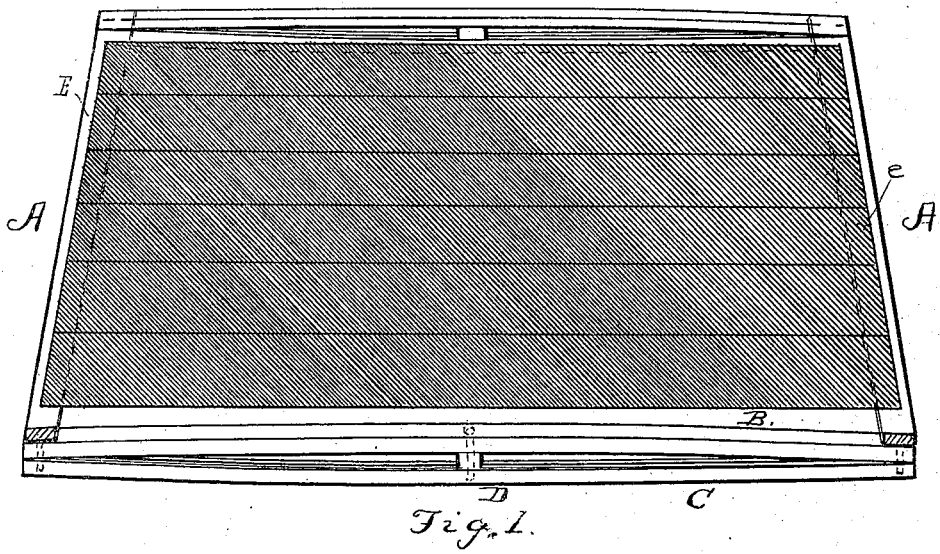
Figure 2:
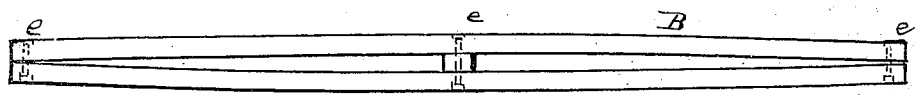
Figure 3:

Figure 1 represents an ordinary spring-bed constructed of wire with my improved side bar. Fig. 2 represents longitudinally a side bar constructed on the plan of my improved side bar. Fig. 3 represents a section of the side bar.

The side bars of my improved bed-bottom are each formed of two strips of wood of substantially the same size from end to end. B and C represent the two strips. In constructing the bed-bottom they are placed side by side one above the other. Their extreme ends are joined and rigidly held together, and the ends bolted or riveted to cross-bars E E by bolts or rivets *e e*. The strips forming the side bars are separated from each other in their middle from one to two inches, and are held rigidly in this position by block D, placed between them, the upper and lower slats of the side bar thereby forming a partial curve, thereby forming a brace or support against the strain produced by the wire-cloth which is attached to cross-bars E E. A represents the ordinary wire-cloth used in the mattress bed-bottom. This is rigidly attached to cross-bars E E. When the strain is applied to the surface of the wire-cloth, the peculiar shape of the side bars serves to act as a brace, thereby preventing their centers from warping downward.

I am aware that side bars to spring bed-bottoms have been heretofore constructed in longitudinal sections; but so far as I am aware the extreme ends of the side bars have been separated by a block of wood and the middle depressed, so that they came in contact, and were secured by a rivet passing through the same. This I do not claim.

What I claim as new, and desire to secure by Letters Patent, is—

The side bars of a bed-bottom, formed of two strips of wood of about equal size from end to end placed side by side one above the other with their extremes rigidly held together, the two secured to cross-bars E E by bolts *e e*, the strips forming the side bars separated and bowed in their middle, in combination with support D between them, constructed and arranged substantially as described, for the purposes stated.

GEORGE E. BEDELL.

Witnesses:
 C. E. DAVENPORT,
 WILLIAM P. QUIN.